Patented Nov. 8, 1938

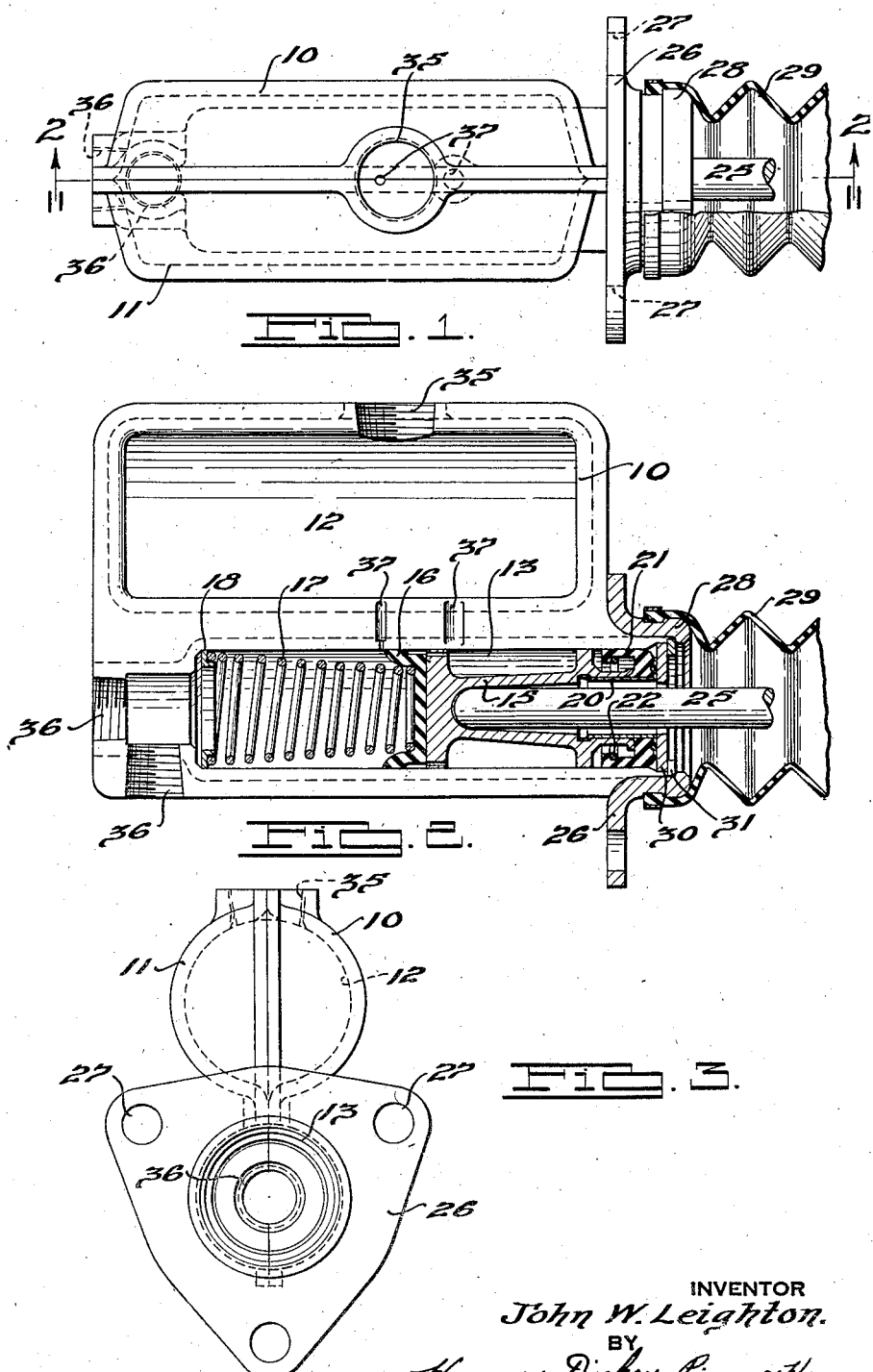

2,136,302

UNITED STATES PATENT OFFICE 2,136,302

HYDRAULIC BRAKE CYLINDER AND METHOD OF MAKING SAME

John W. Leighton, Port Huron, Mich.

Application February 15, 1936, Serial No. 64,048

12 Claims. (Cl. 29—152.1)

The present invention relates to master cylinder constructions for hydraulic brake systems, such as are commonly used in automotive vehicles. More particularly, the present invention relates to a novel form of hydraulic brake cylinder and associated fluid reservoir and to a unique method of manufacturing the same.

It is a general object of the present invention to provide a brake cylinder construction which is easy and cheap to manufacture and which, when completed, provides an arrangement of parts extremely strong and rugged in construction.

The present invention contemplates the provision of a brake cylinder and associated feed reservoir which are formed by uniting a pair of preformed sheet metal stampings in face-to-face relationship and securing the stampings together to provide a unit construction. Prior to their securement, the stampings are preformed to provide semi-cylindrical recesses in the surface thereof, which mate with complemental semi-cylindrical recesses in the opposite stamping, so that the recesses together will not only form the reservoir and the cylinder, but also provide ports or ducts therebetween.

The present invention further contemplates the provision of a supporting bracket structure which is permanently secured to the members making up the cylinder and reservoir construction, which serves to position these parts and maintain them in predetermined assembled position during the time they are welded.

The invention further contemplates a method of manufacture for articles of this type which includes novel steps hereinafter pointed out, which contribute to a greatly simplified process for making the brake cylinder disclosed herein, and also other similar articles where analogous problems are involved.

Many other and further objects and advantages of the present invention will become clearly apparent from the following specification when considered in connection with the accompanying drawing forming a part thereof.

In the drawing:

Figure 1 is a top plan view of the improved master cylinder construction showing a fragmentary portion of a brake operating mechanism connected thereto.

Figure 2 is a transverse sectional view taken substantially on the line 2—2 of Figure 1 showing the interior construction of the master cylinder and associated reservoir and showing in detail the arrangement of ports.

Figure 3 is an end elevation with the piston construction removed showing in detail the arrangement of parts making up the improved master cylinder construction.

With more particular reference to the specific embodiment of the invention illustrated in the drawing, the construction shown therein comprises a pair of sheet metal stampings 10 and 11 flanged in their marginal edges and secured together through these mating flanges to provide a fluid reservoir 12 and a cylinder 13.

As is conventional in constructions of this general character, the cylinder 13 is adapted to receive, and has mounted therein a piston 15 which, at its forward end, is provided with a cup shaped washer 16 of suitable resilient material adapted to closely engage the walls of the cylinder. This washer 16 is maintained seated against the face of the piston 15 and its predetermined longitudinal position within the cylinder is maintained by means of a conical compression coil spring 17, the opposite end of which is supported in a suitable metallic annulus 18 of angle section positioned substantially against the end wall of the cylinder. The rear end of the piston 15 is constructed to provide recess for seating an annular sheet metal retainer 20 which serves to support an annular resilient packing member 21 which is urged radially outwardly against the walls of the cylinder by means of a suitable spring split ring 22. The piston 15 has an axial bore therein adapted to receive a suitable operating rod 25 which, as is conventional, is connected by means of suitable mechanism to the operating pedal.

The brake cylinder construction as a whole is supported by means of a bracket 26 preferably formed of sheet metal and of generally triangular configuration. This bracket has a plurality of holes 27 therein adapted to receive suitable bolts for mounting the structure as a whole on the frame of the vehicle. The bracket is preformed in its central portion to provide a substantially cylindrical opening therein adapted to receive portions of the stampings 10 and 11 and to closely surround and position the same. As will be apparent from the following, this bracket 26 is permanently secured to the mating stampings 10 and 11 and forms substantially an integral part thereof in the finally assembled construction. The metal of the bracket 26 is preformed around this central aperture to provide an axially extending, annular flange 28 which provides means for mounting one end of a flexible extensible bellows or boot 29 surrounding the brake operating arm. If desired, the rear end of the cylinder 13 may be closed by a suitable annular washer 30 retained in place by means of an expansible split ring 31.

In the manufacture of the improved master cylinder assembly of the present invention, the pair of substantially identical sheet metal stampings are formed substantially as described above. These stampings 10 and 11 are each provided with semi-cylindrical depressions therein surrounded by flanges which lie substantially in the plane of the sheet of metal from which the stampings were formed. These semi-cylindrical depressions mate to form the cylinder 13 and the fluid reservoir 12. At the time these stampings are formed, they are also preformed to provide semi-cylindrical depressions in the mating flanges which together form a filling opening 35 of substantially circular configuration when the two stampings are placed together face to face. The stampings are further preformed to provide mating semi-cylindrical grooves which form ports 36 communicating with the cylinder 13 and ducts 37 which provide communication between the reservoir 12 and the cylinder 13. After the stampings have been formed, the faces thereof are ground to provide plane surfaces and to create the necessary sharp corners at the mating edges of the cylinders and ports. The stampings 10 and 11 are then placed in mating relation face to face and the bracket 26 is slipped over the projecting portion of the mating stampings which constitute the cylinder 13. It will be seen that the cylindrical portion of this bracket encompasses portions of the stampings 10 and 11 and serves to lock them in assembled relation. Suitable strips of copper wire may then be disposed within the cylinder and within the reservoir adjacent the juncture of the two sheet metal stampings which make up these elements. Additional copper wire may be disposed adjacent the joint between the stampings and the bracket 26 and the assembled apparatus as a whole is then heated to welding temperature in an inert atmosphere and the copper from the wire will flow into the cracks and seal the mating stampings together and the bracket thereto to provide a substantially integral construction. After the parts have been welded together in this manner, the filler hole 35 may be internally threaded to recive a suitable plug and the port 36 may be internally threaded to receive suitable fittings for connecting feed conduits thereto, which feed conduits normally extend to auxiliary cylinder constructions located adjacent the brakes of the vehicle with which the master cylinder is used. It will be noted that the ports providing communication between the reservoir and the cylinder are of relatively small size and consequently there may be some tendency for these ports to clog as a result of the welding process. Consequently, it will be noted that the feed hole 35 is disposed in such position that access may be had to these ports should it be necessary to drill them out after the welding operation has finally been completed.

After the sheet metal parts have been assembled and welded together, the cylinder 13 may be bored out with a diamond drill to provide a smooth, cylindrical, internal surface and the piston and other associated parts may then be installed. It has been found that the grinding of the adjacent faces of the mating stampings which make up the cylinder construction and the subsequent diamond boring of the interior of the cylinder provide an extremely satisfactory construction and it has been further found that if the parts are accurately assembled, no trace of the joint between the mating sections is discernible. From the foregoing, it will be appreciated that an extremely simple and satisfactory master cylinder construction has been provided.

The above specific embodiment of the invention is merely illustrative of the generic inventive concept presented herein. Many and other further modification modifications falling within the scope of the invention as defined in the subjoined claims will be apparent to those skilled in the art.

What is claimed is:

1. A master cylinder construction for brake systems comprising a pair of sheet metal stampings having mating flanges welded together face to face, said stampings being preformed to provide a reservoir and a cylinder therebetween.

2. A master cylinder construction for brake systems comprising a pair of sheet metal stampings having mating flanges secured together face to face, said stampings being preformed to provide a reservoir, a cylinder, and a port providing communication between said cylinder and reservoir.

3. A master cylinder construction for brake systems comprising a pair of sheet metal stampings having mating flanges secured together face to face, said stampings being preformed to provide a reservoir, a cylinder, and a port communicating with said cylinder.

4. A fluid reservoir for hydraulic brake systems comprising a pair of sheet metal stampings flanged in their marginal edges and secured together through said mating flanges said stampings being preformed to jointly provide a substantially cylindrical opening communicating with said reservoir.

5. A fluid reservoir for hydraulic brake systems comprising a pair of sheet metal stampings flanged in their marginal edges and welded together through said mating flanges, said flanges each being preformed to provide a semi-cylindrical groove therein, said grooves cooperating to provide an opening communicating with the interior of said reservoir.

6. A master cylinder construction for hydraulic brake systems comprising a pair of sheet metal stampings having mating flanges, said stampings being secured together face to face through said flanges and forming a cylinder therebetween.

7. A master cylinder construction for hydraulic brake systems comprising a pair of sheet metal stampings having mating flanges, said stampings having substantially identical semi-cylindrical depressions therein and welded together face to face through said flanges, said depressions together forming a cylinder between said stampings.

8. A master cylinder construction for hydraulic brake systems comprising a pair of sheet metal stampings having mating flanges, said stampings having substantially identical semi-cylindrical depressions therein and substantially semi-cylindrical grooves in said flanges, said stampings being secured together face to face whereby said depressions mate to form a cylinder and said grooves mate to form a port in communication with said cylinder.

9. The method of forming a master cylinder construction for use in hydraulic brake systems which comprises forming a pair of stampings having mating flanges which together provide a cylinder therebetween, welding said stampings together and finishing the interior of said cylinder to provide a smooth cylindrical interior surface.

10. The method of forming a master cylinder construction for use in hydraulic brake systems which comprises forming a pair of stampings having mating flanges which together provide therebetween a cylinder, a reservoir and a port providing communication between said cylinder and reservoir, welding said stampings together and finishing the interior of said cylinder to provide a smooth cylindrical interior surface.

11. The method of forming a master cylinder construction for use in hydraulic brake systems which comprises forming a pair of stampings having mating flanges which together provide therebetween a cylinder and a port communicating with said cylinder, welding said stampings together face to face, finishing the interior of said cylinder to provide a smooth cylindrical surface and internally threading said port.

12. The method of forming a master cylinder construction for use in hydraulic brake systems which comprises forming a pair of stampings having mating flanges which together provide a cylinder therebetween, copper welding the flanges of said stampings together, and diamond boring the interior surface of said cylinder.

JOHN W. LEIGHTON.